United States Patent
Van Der Sluis et al.

(10) Patent No.: US 7,367,909 B2
(45) Date of Patent: May 6, 2008

(54) DRIVE BELT AND CONTINUOUSLY VARIABLE TRANSMISSION WHEREIN SUCH IS UTILISED

(75) Inventors: Francis Maria Antonius Van Der Sluis, Sint-Michielsgestel (NL); Arie Gerrit Izaak Van Der Velde, Kaatsheuvel (NL); Cornelis Johannes Maria Van Der Meer, Tilburg (NL); Johannes Hendrikus Van Lith, Berlicum (NL); Arjen Brandsma, Tilburg (NL)

(73) Assignee: Van Doorne's Transmissie B.V., Tilburg (NL)

( * ) Notice: Subject to any disclaimer, the term of this patent is extended or adjusted under 35 U.S.C. 154(b) by 531 days.

(21) Appl. No.: 10/661,541

(22) Filed: Sep. 15, 2003

(65) Prior Publication Data

US 2005/0101424 A1    May 12, 2005

(30) Foreign Application Priority Data

Sep. 30, 2002    (EP)    .................................    02079112

(51) Int. Cl.
*F16G 1/22*    (2006.01)
(52) U.S. Cl. ....................................... 474/242
(58) Field of Classification Search ................ 474/201, 474/237, 238, 242, 243, 245
See application file for complete search history.

(56) References Cited

U.S. PATENT DOCUMENTS 4,619,634 A * 10/1986 Nakawaki ................... 474/201
4,824,424 A * 4/1989 Ide et al. ..................... 474/242
6,612,954 B2 * 9/2003 Akagi et al. ................ 474/242

FOREIGN PATENT DOCUMENTS

| EP | 0 279 645 | 8/1988 |
|---|---|---|
| EP | 0 283 303 | 9/1988 |
| EP | 0 950 830 | 10/1999 |
| EP | 1 111 271 | 6/2001 |

* cited by examiner

*Primary Examiner*—Vicky A. Johnson
(74) *Attorney, Agent, or Firm*—Young & Thompson

(57) ABSTRACT

Drive belt provided with a continuous band having a radially inwardly oriented surface and a radially outwardly oriented surface, and with an array of plate-like transverse elements engaging the continuous band. The band is curved in a transverse direction at a crowning radius of curvature Rcrown and provided with an internal residual stress distribution defining a curling radius of curvature Rcurl at which the band would be curved in longitudinal direction when cut, whereby the continuous band can be bent at a minimum radius of curvature Rmin in longitudinal direction and whereby the ratio between the curling radius and the minimum radius Rcurl/Rmin satisfies the equation:

$$R\text{curl}/R\text{min}=(\delta i+\delta o)/\delta o$$

wherein $\delta i$ is the largest perpendicular distance in the radial direction between a neutral line NL in the cross section of the continuous band where the stress due to pure longitudinal bending would be zero and the radially inner most surface of the band and $\delta o$ is the largest perpendicular distance in the radial direction between the neutral line NL and a radially outer most surface of the band.

11 Claims, 3 Drawing Sheets

DRIVE BELT AND CONTINUOUSLY VARIABLE TRANSMISSION WHEREIN SUCH IS UTILISED

BACKGROUND OF THE INVENTION

The present invention relate to a drive belt. The invention further relates to a continuously variable transmission wherein such drive belt is utilised.

DESCRIPTION OF THE RELATED ART

Drive belts of the present type are generally known through their application in continuously variable transmissions intended for the transmission of mechanical power at continuously variable speed and torque ratios between an engine and a load in particular for automotive purposes. Such drive belts are also known from the European patent specification EP-B-0.279.645. The known drive belt generally comprises two endless carriers and an array of plate-like transverse elements oriented mutually parallel transverse to a longitudinal direction of the drive belt, whereby the continuous band is provided in a slot of the elements such that the elements may freely slide along the band in the longitudinal direction thereof. Typically, the carriers are a laminated package of a number of concentrically stacked continuous bands. Through this measure, the carrier may have a considerable tensile strength, whereas it is still relatively easily bendable in its longitudinal direction.

Because of the nature of use in continuously variable transmissions, where it rotationally connects two pulleys each having two pulley discs that define a V-groove of variable width, the known drive belt is subjected to tensioning, bending and stretching during operation, resulting in high internal stress levels that vary in dependence on the rotational speed of the pulleys and the torque applied to the transmission. The trajectory of the belt thereby includes two longitudinally straight parts where it crosses over from one pulley to the other and two longitudinally bent parts where it runs between the discs of a pulley at a respective radius of curvature for each of said two pulleys, which radii define the transmission ratio of the transmission. As a result of said tensioning, bending and stretching, a stress in the continuous band near its radially inwardly oriented surface varies cyclically during operation of the drive belt in the transmission between a maximum (positive or tension) stress level when the band is stretched and a minimum (negative or compression) stress level when the band is bent, whereas such maximum and minimum levels occur in opposite order for near the radially outwardly oriented surface of the band. Such cyclical variations render the drive belt prone to fatigue cracking, which may ultimately cause the drive belt to fail. To minimise the risk of belt failure due to fatigue cracking, or put alternatively to extend functional belt life as much as possible by improving its resistance against fatiguing, the known continuous bands are pre-bent, i.e. they are provided with an internal residual stress distribution during manufacturing. Generally, such pre-bending is realised by individually mounting the bands around two rollers that are simultaneously rotated and moved apart, whereby the band plastically deforms as it bends around the rollers. The diameter of the rollers thereby largely determines the distribution of the internal residual stress. This pre-bending process is sometimes also denoted the band calibration process because it also determines the circumference length of the band.

According to the known art, the distribution of the internal residual stress is preferably provided such that during operation of the drive belt the maximum tension stress near the radially inwardly oriented surface and the maximum tension stress near the radially outwardly oriented surface of the continuous bands are equal and, consequently, that the overall maximum tension stress at a minimum. The above-mentioned optimum situation is known to occur when the internal residual stress distribution of a continuous band corresponds to a stress distribution under the influence of which the continuous band would be longitudinally bent at a radius of curvature that is twice a minimum radius of curvature at which it may be bent during operation in the transmission. The radius of curvature at which a continuous band would be curved under the influence of the internal residual stress distribution, e.g. when cut, is hereby denoted as the curling radius. It is remarked that it is known from the European patent specification EP-B-0.283.303 to determine such internal residual stress distribution and curling radius of the continuous band by transversely cutting the band and by measuring the radius of the curvature in the longitudinal direction of the posture assumed by the cut continuous band.

Thus according to the known art the desired curling radius is defined as twice the minimum radius of curvature at which the endless band is bent in its longitudinal direction during normal operation of the transmission in which the drive belt is applied.

It is noted that generally speaking and at least for drive belts to be applied in passenger car transmissions, such minimum radius of curvature occurring during operation corresponds fairly accurately to a minimum physical radius of curvature of the drive belt that is determined by the transverse elements having a tapered end defining a maximum amount of mutual rotation of adjacent and mutually contacting elements about an axial of the drive belt in combination with a dimension of the elements in the longitudinal direction of the drive belt, alternatively denoted element thickness. Of course, the latter minimum radius is somewhat, i.e. approximately 10% for typical automotive application of the drive belt such as in passenger cars, smaller than the minimum radius of curvature actually occurring during operation to allow the full range of transmission ratios of the transmission to be realised.

It is further noted that locally in a longitudinally bent trajectory of the belt the minimum radius of curvature of the continuous band may be smaller than the average radius of curvature of the band along such trajectory due to the so-called polygon effect, which relates to the design of the drive belt and is explained further with reference to FIG. 3 in the below.

Although pre-bent at such curling radius the continuous bands should provide the drive belt with a longest possible functional life, it appeared in practice that the contemporary drive belt design is still prone to early failure as a result of fatigue fracture with respect to what was to be expected theoretically, which fatigue fracture was surprisingly found to predominantly initiate near the radially inwardly oriented surface of the band. Accordingly, currently applied drive belts are over dimensioned with respect to their nominal torque transmission capacity, which means that they are provided with an endless band or bands that has or have a larger longitudinally facing cross sectional surface area than that what would theoretically required according to the known art. Such increased cross sectional surface area favourably decreases the maximum tensile stress in the continuous bands, which may for instance be realised by increasing the number of continuous bands applied in a carrier or by increasing the transverse width thereof. These measures adversely affect the cost price and size of the belt and, therefore, are principally undesirable.

SUMMARY OF THE INVENTION

It is an object of the invention to improve the functional life of the known drive belt without increasing its cost price, or, alternatively, lowering the cost price of the drive belt for a given nominal torque transmission capacity.

An important aspect underlying the present invention is that in the contemporary drive belt design the continuous bands of the carrier do not have an exactly rectangular cross section, but rather are provided with an arc-like shape as seen in such cross section of the bands, at least when they are brought in a longitudinally straightened posture. The radius of the arc-like shape is denoted as the crowning radius. In the European patent application EP-A-1.111.271 the implications of such arc-like shape are discussed. Also it is known from EP-A-1.111.271 that the bands are subjected to the phenomenon that is known as anticlastic bending, which causes the crowning radius of the bands to vary substantially during use of the drive belt.

Further the invention relies on the insight that the parameter of the crowning radius and also the variations thereof due to anticlastic bending have a substantial influence on the internal stress distribution of the bands, which has been analysed and quantified by the present invention and which is elaborated on in the below with reference to the drawing. In the invention this influence is taken into account such that it may again be realised that during operation of the drive belt the maximum tension stress near the radially inwardly oriented surface and the maximum tension stress near the radially outwardly oriented surface of the continuous bands are equal and, consequently, that the overall maximum tension stress is at a minimum. The drive belt according to the present invention thus incorporates continuous bands provided with the optimum internal stress distribution and resistance against fatigue fracture, whereby the crowning radius of the band is favourably taken into account.

BRIEF DESCRIPTION OF THE DRAWINGS

The above and other aspects of the invention, which will become apparent from the detailed description below, are illustrated in the accompanying drawings, in which.

DESCRIPTION OF THE PREFERRED EMBODIMENTS

Figure 1:
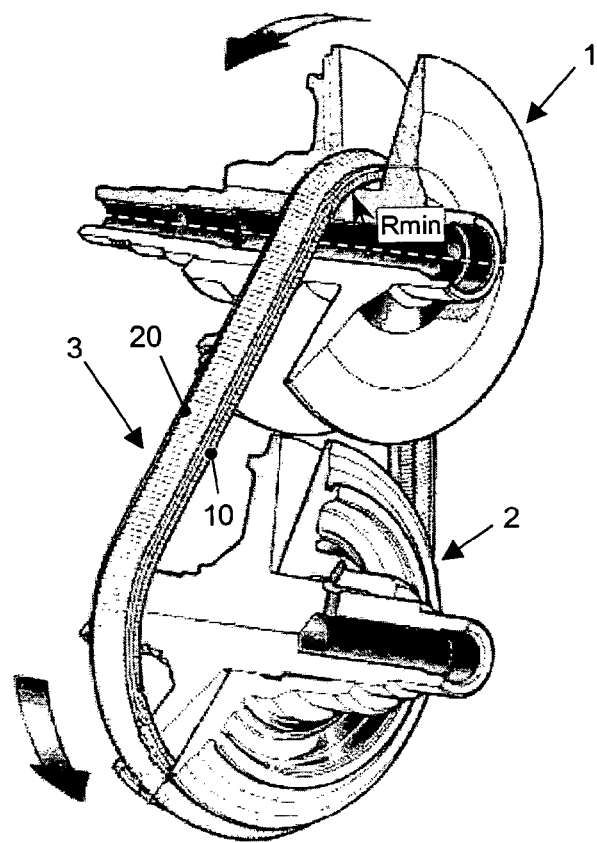
FIG. 1 is schematic depiction drawn in perspective of a transmission wherein the drive belt according to the invention is used.

FIG. 1 is a schematic depiction drawn in perspective of a transmission wherein the drive belt 3 according to the invention is used, which comprises a large number of transverse elements 20 that are mounted on an endless carrier 10 such that the elements 20 can slide over the carrier 10 along its longitudinal direction. The transmission comprises two pulleys 1 and 2 that each define a tapered substantially torus-shaped groove of variable width, wherein a longitudinally curved section of a drive belt 3 is mounted. In the figure the drive belt 3 is the most tightly bent in the first pulley 1, i.e. bent at a minimum radius of curvature in the longitudinal direction Rmin, whereas it traverses between the pulleys 1 and 2 in a straightened section. This type of transmission and its operation are well known in the art.

Figure 2:
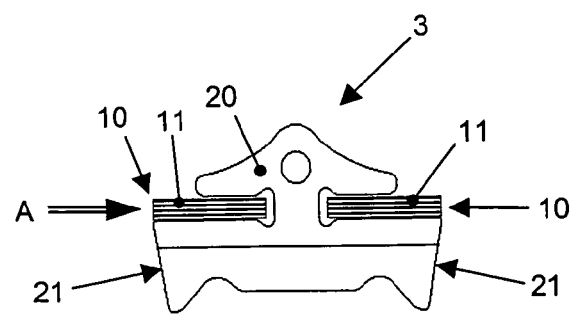
FIG. 2 is a cross section of the drive belt.

FIG. 2 is a cross section of the drive belt 3 as seen in longitudinal direction. The figure shows a front elevation of a transverse element 20, and a cross section of the carrier 10, which in this embodiment of the drive belt 3 is shown to comprise two parts that each comprise a continuous bands 11 mounted in a recess on either lateral side of the element 20. It is, however, normal practice that each part of the carrier is composed of a number of concentrically nested bands 11. The element 20 arrives into contact with the pulleys 1 and 2 during operation of the transmission through lateral contact surfaces 21.

Figure 3:
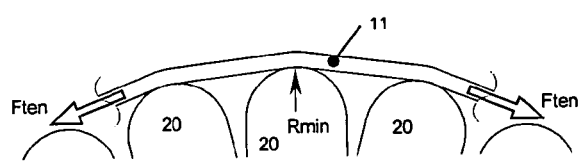
FIG. 3 illustrates the so-called polygon effect in the drive belt.

FIG. 3 illustrates the influence of the so-called polygon effect on the minimum radius of curvature Rmin at which the continuous band 11 is bent and subjected to a tensile force Ften in the longitudinal direction during operation. From this figure it appears that because of the finite number of transverse elements 20 that support the band 11 when the drive belt 3 is in a longitudinally bent trajectory part as it runs between the discs of a pulley, the said minimum radius of curvature Rmin may be somewhat, approximately 10%, smaller than the average radius of curvature of the belt 3, i.e. the radius of curvature of the band 11 when it would be smoothly and continuously curved along said bent trajectory. According to the invention such phenomenon that locally the minimum radius of curvature Rmin of the continuous band 11 is smaller than an average radius of curvature along said bent trajectory might be taken into account for optimum results.

Figure 4:
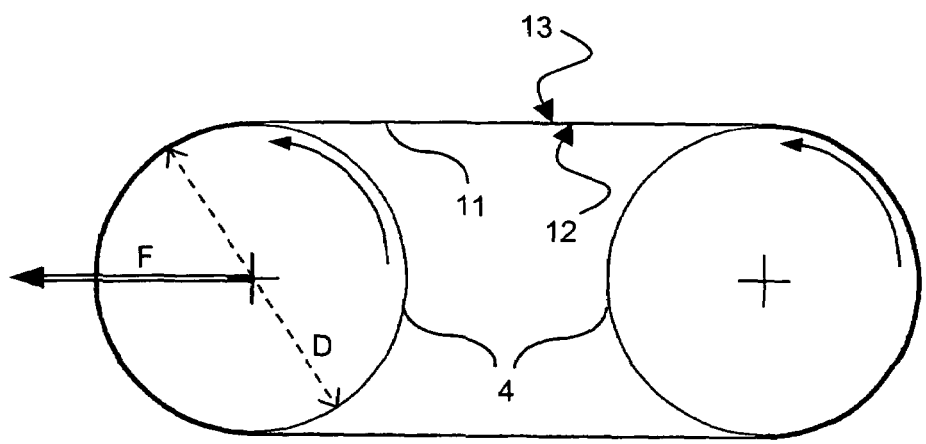
FIG. 4 schematically depicts the pre-bending process of a continuous band.

FIG. 4 schematically depicts in a side elevation the pre-bending process of a continuous band 11 having a radially inwardly oriented surface 12 and a radially outwardly oriented surface 13, which process is used to provide the band 11 with an internal residual stress distribution. In this pre-bending process the band 11 is mounted around two rollers 4 that are simultaneously rotated and moved apart as indicated by the arrow F to such an extend that the band 11 plastically deforms. The diameter D of the rollers 4 thereby determines the distribution of the internal residual stress, which distribution may be characterised by the radius of curvature in the longitudinal direction of the band 11 when it is cut perpendicular thereto, i.e. the curling radius Rcurl. It is remarked that due to production tolerances said curling radius Rcurl may in fact vary along the circumference of the band 11. However, in such case the invention relates to the average value of the curling radius Rcurl.

Figure 5:
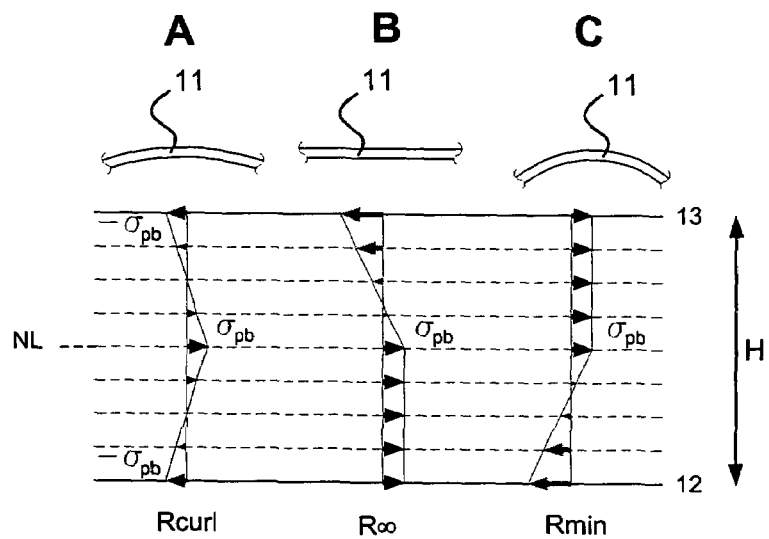
FIG. 5 illustrates the internal stress distribution in the continuous band as a result of longitudinal bending for three postures of the band.

FIG. 5 illustrates the internal stress distribution due to longitudinal bending in a side elevation of a section of the pre-bent continuous of the band 11, i.e. looking in the direction of arrow A in FIG. 2, for three postures thereof that are characterised by their curvature or amount of bending in the longitudinal direction. In the FIG. 4, $\sigma_{PB}$ denotes the largest internal residual tension and compression stress introduced in the pre-bending process. The neutral line NL represents the line where the stress due to bending is zero. On opposite sides of this line the said stress has an opposite sign, i.e. changes from a tension stress to a compression stress. The neutral line relates to pure longitudinal bending, i.e. the pre-bending stresses, the tension stress component that will be present during operation of the transmission and any other stress component is thereby not taken into account. According to the invention this simplification is allowed because said other stress components are considered to be more or less symmetrically distributed over the height H, i.e. in the radial direction of the continuous band 11.

In the first posture A, the curvature of the continuous band 11 corresponds to the curling radius Rcurl whereby the compression stress at the radially inwardly oriented surface or inner fibre 12 of the continuous band 11, which is denoted the inner fibre stress, and the compression stress at the radially outwardly oriented surface or outer fibre 13 of the continuous band 11, which is denoted the outer fibre stress, are equal and also relatively small. In the second posture, B the band 11 is straightened, which is representative of the section of the drive belt 3 that is located between the pulleys 1 and 2. In this posture, the inner fibre stress is a positive or tension stress and the outer fibre stress is a negative or compression stress, whereby the absolute inner fibre stress level is at an overall maximum level. In the third posture, C the band 11 is longitudinally bent at the minimum radius of curvature in the longitudinal direction Rmin that occurs during operation of the drive belt 3 in the transmission. In this posture, the outer fibre stress is a tension stress and the inner fibre stress is a compression stress, whereby the absolute outer fibre stress level is at an overall maximum level.

According to the known art the overall maximum inner fibre stress level is equal to the sum of the pre-bending compression stress $-\sigma_{PB}$ and a tension stress $\sigma_{BS}$ occurring in the inner fibre 12 as a sole result of bending the pre-bent continuous band 11 straight, which latter stress $\sigma_{BS}$ is approximated according to simple beam bending theory by the equation:

$$\sigma_{BS}=(\delta \cdot E)/R\text{curl} \quad (1)$$

In this equation (1) $\delta$ is half the height of the continuous band 11, i.e. half the radial distance between the inner and outer fibres 12, 13 and E is Young's modulus of elasticity.

The overall maximum outer fibre stress level is equal to the sum of the pre-bending compression stress $-\sigma_{PB}$, a compression stress occurring in the inner fibre $-\sigma_{BS}$ as a sole result of bending the pre-bent continuous band 11 straight that is given by equation (1) and a tension stress $\sigma_{BM}$ occurring in the outer fibre 13 as a sole result of bending such initially straight band 11 to the minimum radius of curvature Rmin, which latter stress $\sigma_{BM}$ is given by the equation:

$$\sigma_{BM}=(\delta \cdot E)/R\text{min} \quad (2)$$

Also according to the known art said maximum outer and inner fibre stress levels are advantageously at a minimum when they are equal, i.e. by solving the equation:

$$-\sigma_{PB}+\sigma_{BS}=-\sigma_{PB}-\sigma_{BS}+\sigma_{BM} \quad (3)$$

By inserting equation (1) and (2) into equation (3) the following equation is found:

$$-\sigma_{PB}-(\delta \cdot E)/R\text{curl}=-\sigma_{PB}+(\delta \cdot E)/R\text{curl}-(\delta \cdot E)/R\text{min} \quad (4)$$

By solving equation 4, the optimum curling radius Rcurl for the continuous band 11 in terms of minimisation of the maximum stress level and fatigue resistance optimisation is found:

$$R\text{curl}=f_{PB} \cdot R\text{min, where } f_{PB}, \text{ denoted the pre-bending factor equals 2} \quad (5)$$

Figure 6:
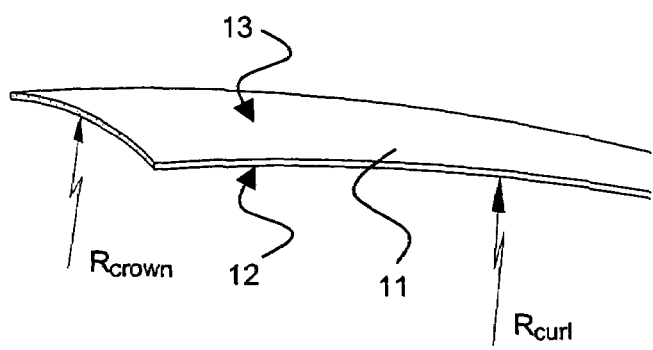
FIG. 6 depicts a section of a cut a continuous band drawn in perspective and defining the crowning radius and the curling radius in accordance with the invention.

Although the above-described known theory is valid per se, it was found that for contemporary drive belt designs the fatigue life does not satisfy expectations. Accordingly, it has been an object of the invention to further analyse the behaviour of the continuous band 11 during operation. In such analysis it was found that the crowning radius Rcrown that is provided to the bands 11 has a significant influence on the internal stress distribution as has the phenomenon of anticlastic bending. FIG. 6 depicts a section of a continuous band 11 defining the crowning radius Rcrown and the curling radius Rcurl in accordance with the invention.

Figure 7:
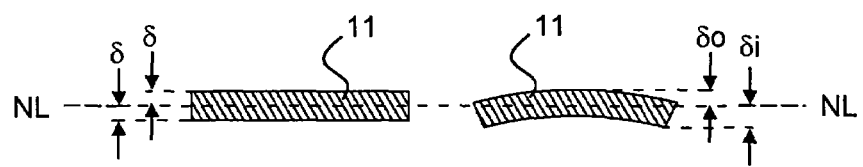
FIG. 7 illustrates the influence of the arc-like shape, i.e. the crowning radius of a cross section of the continuous band on the position of the radially oriented outer surfaces of the band relevant to the cross section centre line in an exaggerated manner.

The invention provides an improved theoretical analysis and model of the stresses due to bending in the continuous band 11 during operation of the drive belt 3 and defines an optimum design of the band 11 in terms of its curling radius Rcurl based thereon. The analysis according to the invention recognises that the transverse curvature of continuous bands 11 that is nowadays applied significantly influences its longitudinal bending. More in particular, the maximum separation between the inner and the outer fibres 12 and 13 increases as the crowning radius Rcrown of the band 11 decreases. Moreover, when the crowning radius Rcrown decreases, a maximum inner fibre distance $\delta i$ that is measured between the inner fibre 12 and the neutral line NL for pure bending increases more than a maximum outer fibre distance $\delta o$ that is measured between the outer fibre 13 and the neutral line NL, which effect is illustrated in FIG. 7 in an exaggerated manner.

Taking the above-mentioned effects into account, equation (4) may be rewritten as:

$$-\sigma_{PB}-(\delta i \cdot E)/R\text{curl}=-\sigma_{PB}+(\delta o \cdot E)/R\text{curl}-(\delta o \cdot E)/R\text{min} \quad (6)$$

In terms of the pre-bending factor $f_{PB}$ it may according to the present invention be arrived at:

$$f_{PB}=(\delta i+\delta o)/\delta o \quad (7)$$

Figure 8:
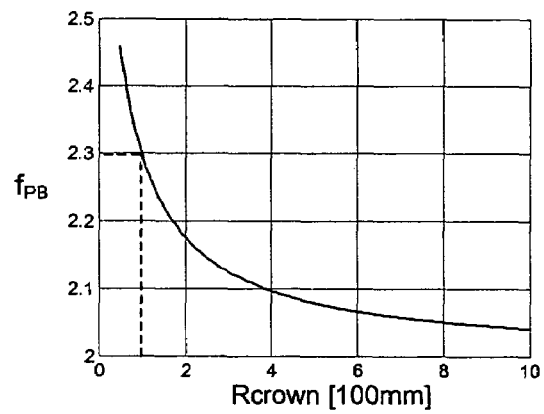
FIG. 8 is a graph of the optimum ratio between the curling radius and a minimum radius of longitudinal curvature of the continuous band in relation to the crowning radius.

FIG. 8 is a graph of the pre-bending factor $f_{PB}$ according to the invention for the typically applied design of the continuous bands having a height of about 185 [μm] and a transverse width of about 9.5 [mm] for a range of typically applied crowning radii Rcrown. As an example the pre-bending factor $f_{PB}$ is highlighted for a typically applied crowning radius of 100 mm when measured in a section of the continuous band 11 that is straightened and tensioned at $0.4 \cdot 10^3$ [N], which pre-bending factor $f_{PB}$ is approximately 2.3 and thus is substantially larger, about 15%, than what was previously considered the optimum value. Continuous bands 11 satisfying the pre-bending factor $f_{PB}$ according to the invention have an improved fatigue resistance.

According to the invention, the said optimum pre-bending factor $f_{PB}$ may be improved further still by also taking into account the phenomenon of anticlastic bending that is discussed in, inter alia, the European patent applications EP-A-1.111.271 and EP-A-0.905.830. Although it is known that the anticlastic bending phenomenon causes the crowning radius Rcrown to increase as the continuous band 11 is increasingly bent in its longitudinal direction, the exact effect can not be easily determined analytically. The invention, therefore, proposes a more empirical approach, wherein equation (6) is rewritten as follows:

$$-\sigma_{PB} \cdot f_i \cdot (\delta i \cdot E)/R\text{curl} = -\sigma_{PB} + f_o \cdot \{(\delta o \cdot E)/R\text{curl} - (\delta o \cdot E)/R\text{min}\} \tag{8}$$

In this equation (8) $f_i$ is a stress factor defining the relative increase of the maximum tension stress level at the inner fibre 12 due to anticlastic bending when the band 11 is bent straight and $f_o$ is a stress factor defining the relative increase of the maximum tension stress level at the outer fibre 13 due to anticlastic bending when the band 11 is longitudinally curved at the said minimum radius of curvature Rmin.

In terms of the pre-bending factor $f_{PB}$ it is according to the present invention arrived at:

$$f_{PB} = (f_i \cdot \delta i + f_o \cdot \delta o)/(f_o \cdot \delta o) \tag{9}$$

or $$f_{PB} = \{(f_i/f_o) \cdot \delta i + \delta o\}/\delta o \tag{10}$$

The stress factors $f_i$ and $f_o$ may be determined by comparing the maximum tension stresses in the continuous band 11 when it is straightened and when it is bent at the minimum radius of curvature Rmin that are obtained with Finite Element Method (FEM) calculations wherein the anticlastic bending phenomenon is included with the results obtained with equation (6). Such comparison is illustrated in FIG. 9, which is a graph of (relative) stress levels in the continuous band 11 having a notional transverse curvature at a crowning radius Rcrown along the transverse width of the band 11 as seen in cross section, i.e. perpendicular to the height H, as determined with equation (10) and also with said FEM-calculation.

Figure 9:
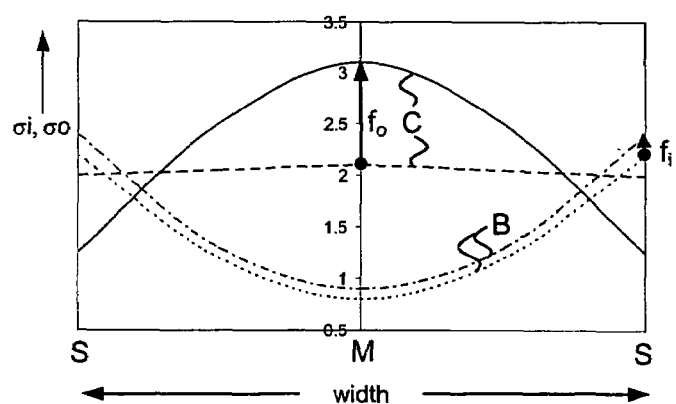
FIG. 9 is a graph of the internal stress levels in the continuous band as determined with equation (10) and with a FEM-calculation that incorporates the phenomenon of anticlastic bending.

In FIG. 9, the solid line indicates the stress level σo at the outer fibre 13 in the band 11 in its most longitudinally bent posture C as calculated with equation (10), whereas the dashed line indicates the result obtained with said FEM-calculation for the same posture C. It is clear that the maximum tension stress σo at the outer fibre 13 occurs essentially in the middle M of the continuous band 11. The stress factor $f_o$ is indicated to represent a multiplication factor between the results of these two calculations.

In FIG. 9, the dotted line indicates the stress level σi at the inner fibre 12 in the band 11 in its longitudinally straightened posture B as calculated with equation (10), whereas the dot-dashed line indicates the result obtained with said FEM-calculation for the same posture B. It is clear that the maximum tension stress σi at the inner fibre 12 occurs at the side edges S of the continuous band 11. The stress factor $f_i$ is indicated to represent a multiplication factor between the results of these latter two calculations.

Figure 10:
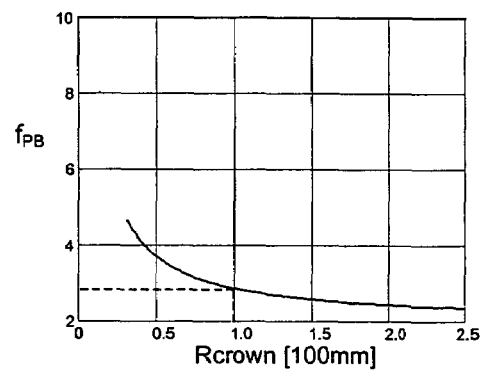
FIG. 10 is a graph of the optimum ratio between the curling radius and a minimum radius of longitudinal curvature of the continuous band in relation to the crowning radius, wherein anticlastic bending is taken into account.

Although with the above approach optimum results may be obtained, it was found that at least for relatively small crowning radii Rcrown, but still including those radii that are most often applied, an approximation may be made without affecting the accuracy of the result. In this respect is was according to the invention found that in the said FEM-calculations that both stress factors $f_i$ and $f_o$ change in dependency on the curling radius Rcurl to essentially the same degree, so that a ratio between said stress factors $f_i/f_o$ hardly depends on the curling radius Rcurl. In addition, the ratio between said stress factors $f_i/f_o$ was found to be essentially uninfluenced by the value of the minimum radius of curvature Rmin of the continuous band 11 during operation of the drive belt 3. The calculations in accordance with the invention showed that, at least for relatively small crowning radii Rcrown, equation (10) can in fact be approximated by:

$$f_{PB} = \{(1 + C/R\text{crown}) \cdot \delta i + \delta o\}/\delta o \tag{11}$$

where C is an empirically determined constant that depend on the overall geometry of the continuous band 11. For a typical drive belt design, C was found to have a value in a range from about 40 to 80, at least when the crowning radius is measured in a straightened section of the continuous band 11 that is tensioned at $0.4 \cdot 10^3$ [N]. In FIG. 10, the pre-bending factor $f_{PB}$ according equation (11) is plotted for a limited range of crowning radii Rcrown, whereby C is equal to 42. Continuous bands 11 satisfying the pre-bending factor $f_{PB}$ according to the invention have a superior fatigue resistance and are ideally suited for application in the continuously variable transmission. As an example the pre-bending factor $f_{PB}$ is highlighted for the most often applied crowning radius of 100 mm that is about equal to 2.8. Again, this value is considerably higher than the pre-bending factor $f_{PB}$ of 2 that previously was considered optimum. Validation tests have shown a potential increase of up to 70% of the service life of the drive belt comprising continuous bands 11 that are provided with a residual stress distribution according to the invention, i.e. that incorporate the optimum curling radius defined by equations (11) and (5).

Finally, it is remarked that it is a well-known practice to subject the continuous bands 11 to a nitriding process, wherein the bands 11 are provided with a surface layer incorporating a permanent compression stress. Because metal fatigue is effected by tension stresses, such surface layer may be disregarded when performing the analysis according to the invention in particular when defining said inner and outer fibres 12 and 13 to determine the parameters δi and δo. Of course, for determining the deformation of a cross section of the band due to longitudinal bending and the influence of the anticlastic bending phenomenon thereon in said FEM calculation, the complete geometry of the band 11, i.e. including such surface layer, should still be taken into account.

The invention claimed is:

1. Drive belt (3) for a transmission realising a continuously variable transmission ratio comprising at least one continuous band (11), having a radially inwardly oriented surface (12) and a radially outwardly oriented surface (13), and an array of plate-like transverse elements (20) engaging said continuous band (11) such that the elements (20) may slide along a longitudinal direction thereof, which continuous band (11) is curved in a transverse direction at a non-infinite crowning radius of curvature Rcrown and is provided with an internal residual stress distribution defining a curling radius of curvature Rcurl at which a continuous band (11) would be curved in its longitudinal direction when cut, whereby during operation the continuous band (11) can be bent in its longitudinal direction at a minimum radius of curvature Rmin and whereby a ratio between the curling radius and the minimum radius Rcurl/Rmin defines a pre-bending factor $f_{PB}$, characterised in that, the pre-bending factor $f_{PB}$ satisfies the equation:

$$f_{PB}=(\delta i=\delta o)/\delta o$$

wherein:
δi is the largest perpendicular distance in the radial direction between a neutral line NL in the cross section of the continuous band (11) where the stress due to pure longitudinal bending would be zero and the radially inner most surface (12) of the band (11) and δo is the largest perpendicular distance in the radial direction between the said neutral line NL and the radially outer most surface (13) of the band (11).

2. Drive belt (3) according to claim 1, characterised in that the radius of curvature Rcrown of the continuous band (11) in the transverse direction, when measured as the band (11) is straightened and tensioned in the longitudinal direction, has a value in the range between 50 mm and 1000 mm.

3. Drive belt (3) according to claim 2, characterised in that the pre-bending factor $f_{PB}$ has a value in the range between 2.15 and 2.45.

4. Continuously variable transmission comprising a drive belt (3) according to claim 1 and two pulleys (1, 2) that each define a tapered and substantially torus-shaped groove of variable width, in which groove a longitudinally curved section of a drive belt 3 is mounted, whereby during operation of the transmission the said section is bent at a smallest radius of curvature in the longitudinal direction Rmin.

5. Drive belt (3) according to claim 1, characterised in that the radius of curvature Rcrown of the continuous band (11) in the transverse direction, when measured as the band (11) is straightened and tensioned in the longitudinal direction, has a value in the range between 50 mm and 250 mm.

6. Drive belt (3) for a transmission realising a continuously variable transmission ratio comprising at least one continuous band (11), having a radially inwardly oriented surface (12) and a radially outwardly oriented surface (13), and an array of plate-like transverse elements (20) engaging said continuous band (11) such that the elements (20) may slide along a longitudinal direction thereof, which continuous band (11) is curved in a transverse direction at a non-infinite crowning radius of curvature Rcrown and is provided with an internal residual stress distribution defining a curling radius of curvature Rcurl at which a continuous band (11) would be curved in its longitudinal direction when cut, whereby the continuous band (11) can be bent in its longitudinal direction at a minimum radius of curvature Rmin and whereby a ratio between the curling radius and the minimum radius Rcurl/Rmin defines a pre-bending factor $f_{PB}$, characterised in that, the pre-bending factor $f_{PB}$ satisfies the equation:

$$f_{PB}=\{(1+C/R\text{crown})\cdot\delta i+\delta o\}/\delta o \qquad (11)$$

wherein:
C is constant having a value in the range between 40 and 80,

δi is the largest perpendicular distance in the radial direction between a neutral line NL in the cross section of the continuous band (11) where the stress due to pure longitudinal bending would be zero and the radially inner most surface (12) of the band (11), and δo is the largest perpendicular distance in the radial direction between the said neutral line NL and the radially outer most surface (13) of the band (11).

7. Drive belt (3) according to claim 6, characterised in that the radius of curvature Rcrown of the continuous band (11) in the transverse direction, when measured as the band (11) is straightened and tensioned in the longitudinal direction, has a value in the range between 50 mm and 250 mm.

8. Drive belt (3) according to claim 7, characterised in that the pre-bending factor $f_{PB}$ has a value in the range between 2.40 and 3.60.

9. Continuously variable transmission comprising a drive belt (3) according to claim 6 and two pulleys (1, 2) that each define a tapered and substantially torus-shaped groove of variable width, in which groove a longitudinally curved section of a drive belt 3 is mounted, whereby during operation of the transmission the said section is bent at a smallest radius of curvature in the longitudinal direction Rmin.

10. Drive belt (3) for a transmission realising a continuously variable transmission ratio comprising at least one continuous band (11), having a radially inwardly oriented surface (12) and a radially outwardly oriented surface (13), and an array of plate-like transverse elements (20) engaging said continuous band (11) such that the elements (20) may slide along a longitudinal direction thereof, which continuous band (11) is curved in a transverse direction at a non-infinite crowning radius of curvature Rcrown and is provided with an internal residual stress distribution defining a curling radius of curvature Rcurl at which a continuous band (11) would be curved in its longitudinal direction when cut, whereby the continuous band (11) can be bent in its longitudinal direction at a minimum radius of curvature Rmin and whereby a ratio between the curling radius and the minimum radius Rcurl/Rmin defines a pre-bending factor $f_{PB}$, characterised in that, the pre-bending factor $f_{PB}$ satisfies the equation:

$$f_{PB}=\{(f_i/f_o)\cdot\delta i+\delta o\}/\delta o$$

wherein:
$f_i$ is a stress factor defining the relative increase of the maximum tension stress at the radially inner most surface (12) due to anticlastic bending when the band (11) is bent straight, $f_o$ is a stress factor defining the relative increase of the maximum tension stress at the radially outermost surface (13) due to anticlastic bending when the band (11) is longitudinally curved at the said minimum radius of curvature Rmin, δi is the largest perpendicular distance in the radial direction between a neutral line NL in the cross section of the continuous band (11) where the stress due to pure longitudinal bending would be zero and the radially inner most surface (12) of the band (11), and δo is the largest perpendicular distance in the radial direction between the said neutral line NL and the radially outer most surface (13) of the band (11).

11. Continuously variable transmission comprising a drive belt (3) according to claim 10 and two pulleys (1, 2) that each define a tapered and substantially torus-shaped groove of variable width, in which groove a longitudinally curved section of a drive belt 3 is mounted, whereby during operation of the transmission the said section is bent at a smallest radius of curvature in the longitudinal direction Rmin.

* * * * *